Figure 3:
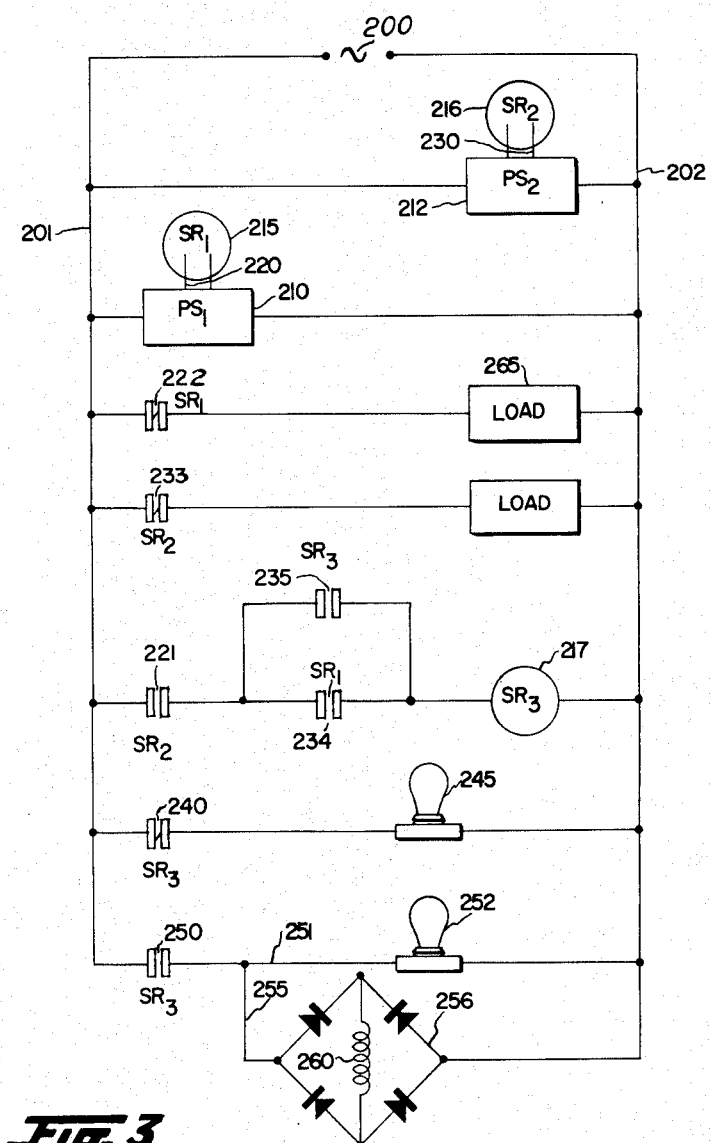

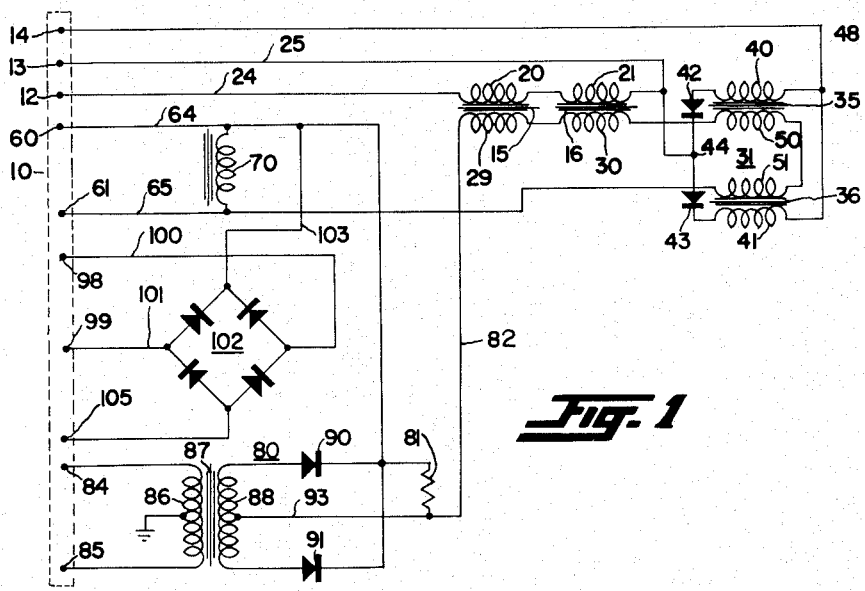

Sept. 26, 1961     D. T. LONGLAND     3,002,106
STATIC SWITCHING APPARATUS
Filed Jan. 27, 1958     3 Sheets-Sheet 3

INVENTOR.
DONALD T. LONGLAND
BY Joseph E. Ryan
ATTORNEY

United States Patent Office 3,002,106
Patented Sept. 26, 1961

3,002,106
STATIC SWITCHING APPARATUS
Donald T. Longland, Sudbury, Mass., assignor to Minneapolis-Honeywell Regulator Company, Minneapolis, Minn., a corporation of Delaware
Filed Jan. 27, 1958, Ser. No. 711,233
16 Claims. (Cl. 307—88)

My invention relates to an improved electromagnetic type control apparatus and more particularly to the type utilizing no moving parts which will hereinafter be designated as a static control device simulating the operation of a magnetic type relay.

The recent advances toward automation in the machine tool, automotive and allied fields have stimulated the improvement in automatic control equipment to facilitate such automation. At the present time there are several logic systems of the static type, that is which use no or relatively few mechanical moving parts, which have been developed and designed toward this end. The complexity of this apparatus which largely has been based on Boolean type algebra has necessitated the re-education of machine tool designers in order to properly think in terms of and to apply such equipment to automation problems. In most instances special circuitry has been required to coordinate such apparatus with existing equipment or a complete reengineering and redesign of the control systems have been required to utilize the present static logic equipment.

Figure 4:
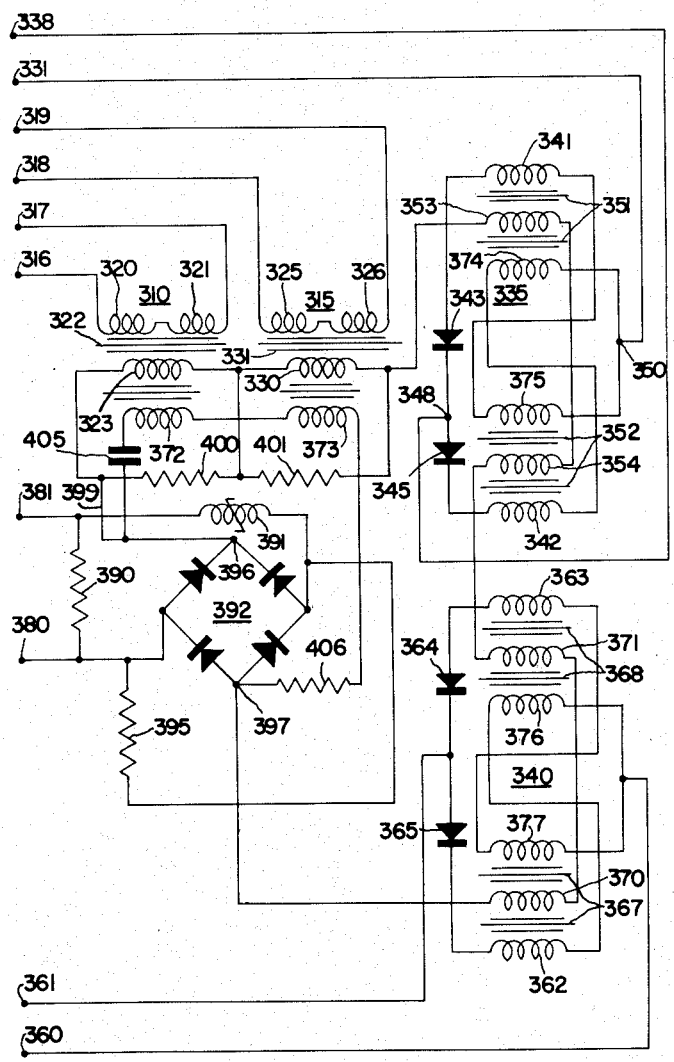

The present invention is directed toward a static control device which may be very simply substituted in place of a conventonal relay apparatus currently used in such control systems and which offers all of the advantages of the static logic equipment. Recognizing that the switching circuits of the present day relays represent conditions of extremely high impedance for an open circuit condition and low impedance for a closed circuit condition, the present invention utilizes electromagnetic control units which simulate the same change in impedance except that the degree or extent of change is not as significant. While it is obvious that the off to on impedance ratio for relay contacts is much higher than can be achieved with electromagnetic control apparatus such as reactors or magnetic amplifiers, it will be recognized that the off to on impedance ratio of such devices is suitable for accurate and continuous control of associated apparatus in the same manner as relay contacts operate. The present invention utilizes such known electromagnetic devices which can be operated in series and still operate properly and with a common energization circuit to perform the switching operation in the same manner as does the relay device but without the detriments of a moving part electromagnetic apparatus and contacts in the switching circuit. It is therefore an object of this invention to provide an improved static electromagnetic control device or relay which is readily adaptable to use in relay circuits and employs simple electromagnetic circuitry. It is further an object of this invention to provide a relay logic circuit adapted to be connected directly in series with a load as a contact element to complete the circuit. It is further an object of this invention to provide an improved static relay apparatus. These and other objects of this invention will become apparent from a reading of the attached description together with the drawings wherein:

FIGURE 1 is a schematic circuit disclosure of a static relay device employing a single pole double throw contact arrangement, and FIGURE 2 is a schematic circuit diagram of another static relay apparatus employing a double pole double throw contact arrangement, FIGURE 3 is a schematic circuit diagram of an application of this type of apparatus to a simplified control circuit, and FIGURE 4 is a schematic circuit diagram of another embodiment of the static relay device employing a double pole double throw contact arrangement.

My improved electromagnetic control apparatus which operates as a switching device and is designated herein as a static relay shown in one form in FIGURE 1 as a single pole double throw relay unit. From the disclosure herein of the schematic it will be understood that all of the apparatus shown in the diagram will be mounted as a single unit in an enclosed casing with terminals leading to the component parts of the circuitry involved. The contact arrangement, that is the normally open and closed switching circuits appear at the terminal board indicated generally at 10 between contact terminals 12, 13 and 14 respectively. The normally open circuit includes a saturable reactor device comprised of two cores 15 and 16 having power windings 20 and 21 respectively mounted thereon. The power windings are connected in series and opposed for balancing purposes being connected to the terminals 12 and 13 through conductors 24, 25 respectively. The cores 15, 16 of the saturable reactor includes control windings 29, 30 which as will be later noted are connected in a common energization circuit for the apparatus. The normally closed switching circuit connected to the terminals 13 and 14 includes a conventional self saturating type magnetic amplifier of the doubler type indicated generally at 31. It includes cores 35, 36 indicated schematically in the drawing which, like cores 15 and 16 of the saturable reactor, may be toroidal or any other configuration. The cores 35, 36 have power windings 40, 41, respectively, mounted thereon with a pair of oppositely poled rectifiers 42, 43 connected in series therewith and to a common point 44 leading to the conductor 25 and terminal 13. The opposite extremities of the windings 40, 41 are connected in common and to a conductor 48 to the terminal 14 completing the power circuit of the conventional doubler type magnetic amplifier for the normally closed switching circuit. Control windings 50, 51 in the embodiment shown in FIGURE 1 are mounted on cores 35, 36 respectively and connected in series and in opposition in a conventional manner and in series circuit with the windings 29, 30 on cores 29, 30 of the reactor. The energizing circuit for the control windings can be of the alternating current or direct current type. Both circuits are shown in FIGURE 1 with the thought that one or the other would be utilized for relay operation. The direct current energizing circuit for the control windings 20, 39, 50 and 51 originates at the terminals 60, 61 respectively to which are connected conductors 64, 65 with a phasing inductive coil 70 connected in parallel across the conductor 64, 65. The control circuit as shown in FIGURE 1 also includes a biasing arrangement or circuit indicated generally at 80 and including a biasing resistor 81 connected in series with a conductor 64 and to a conductor 82 leading to the serially connected coils 29, 30, 50 and 51 and back to the conductor 65 to the terminal 61. The biasing supply is adapted to be connected to the terminals 84, 85 leading to a center tapped primary winding 86 of a transformer 87 having a center tapped secondary winding 88 whose extremities are connected through half-wave rectifiers 90 and 91 to a common point and conductor 64 leading to one extremity of resistor 81 with the center tap of the secondary winding 88 being connected by a conductor 93 to the opposite extremity of the resistor 81 and the conductor 82. Thus the rectifiers 90 and 91 in the circuit of the secondary winding 88 will supply a direct current bias signal to the resistor 81 in series with the control windings for purposes which will be later noted.

If it is desired to energize the control circuit from an alternating current source, the alternating signal will be connected to the terminals 98, 99 and through conductors 100, 101 to the input of a full wave rectifier indicated generally in 102 whose output is connected to a conductor 103 and conductor 64 leading to the control winding energization circuit and terminal 105 which may be grounded with terminal 61 or connected thereto. The alternating current signal applied to the terminals 98, 99 will be rectified by the rectifier 102 and applied in series with the bias resistor 81 to the circuit of the control windings 29, 30, 50 and 51 back to the terminals 61, 105.

In operation this static relay performs or operates in the same manner as a conventional relay. With energization on the control coil which herein is the control windings of the electromagnetic control devices, the switching circuits will be changed from a condition of high impedance or low impedance to an opposite condition low and high impedance respectively. The saturable reactor circuit constitutes a normally open switching circuit which has relatively high impedance with no energization of coils 29 and 30. Similarly the doubler type amplifier circuit constituting the normally closed switching circuit is of a low impedance type, that is, the power windings with energization from the remote source and through the load device will operate as a self saturating apparatus with the present control operating arrangement such that the load will be energized and operated. Energization of the control windings 50, 51 will change the internal impedance of the circuit between conductors 25 and 48 to a rather high impedance constituting an open contact with relay energization. The input signal to the control winding as indicated above can be of the direct current or alternating current type and if direct current, will be applied across the conductor 64, 65 with a small biasing signal applied across the resistor 81 in series therewith. The biasing signal is shown herein as a means for balancing the input device which would be used with the present static relay and which is shown in the copending Longland application Serial No. 625,953, filed December 3, 1956 and entitled "Magnetic Control Apparatus." With other than this device controlling the static relay the biasing circuitry may be omitted. An alternating current input signal may also be used and is fed through the rectifier 102 to be connected in series with the biasing resistor 81 and the coils as indicated above.

The arrangement shown in FIGURE 2 is basically an extension of the apparatus shown in FIGURE 1 to indicate that the double pole double throw circuit arrangement may be utilized herein. The two normally open contacts are obtained through saturable reactors indicated in 110 and 115 which are connected between terminals 116, 117 and 118, 119 respectively. The normally open switching circuit between terminals 116, 117 include power windings 120, 121 mounted on a core 122 having a control winding 123 associated therewith and with the power windings 120, 121 connected in opposition for nulling purposes. The reactor 115 includes power windings 125, 126 serially connected in opposition to terminals 118, 119 with a control winding 130 mounted on the core 131 of reactor 115.

The normally closed contact switching circuits for this embodiment of the static control device or relay are formed by doubler type magnetic amplifiers indicated at 135 and 140 respectively. The switching circuit which includes the amplifier 135 is connected from terminals 137, 138 through conductors to the extremities of a pair of power windings 141, 142 having half-wave rectifiers or diodes 143, 145 respectively connected in series therewith and in opposition to one another being connected at a common point 148 leading to the terminal 137 with the opposite extremities of the power windings 141, 142 connected together at a common point 150 which leads to the terminal 138. Power windings are mounted on separate magnetic core structures of the continuous type indicated generally at 151, 152 respectively with the impedance of the power windings being controlled through control windings 153, 154 respectively. The switching circuits which include the amplifier 140 extends from terminals 160, 161 to one extremity of the power windings 162, 163 with diodes 164, 165 connected in series therewith in opposition to one another with the diodes and power windings being connected parallel in the conventional manner and to conductors 160, 161. The amplifier 140 includes also the continuous magnetic core structures 167, 168 mounting the power windings 162, 163 and having control windings 170, 171 mounted thereon for control of the impedance of the switching circuit.

The control windings 123, 130 of the saturable reactors 110, 115 and the control windings 153, 154 and 170, 171 of the magnetic amplifiers 135 and 140 are all connected in the series circuit to a common energizing source indicated herein at the terminals 180, 181. The individual windings 153, 154 and 170, 171 of the doubler type magnetic amplifiers are connected in opposition in a conventional manner and the same energizing signal current will flow through all the windings in series and simultaneously. An inductance device 190 is connected in parallel across the input terminals 180, 181 of the control circuit and the diode or rectifier 191 is connected in series in the energizing circuit and to the terminal 181 with a condenser 192 connected in parallel therewith. In this embodiment, the bias supply has been omitted and the forward characteristic of the rectifier 191 is utilized to prevent the null voltage of the signal source 180, 181 from driving current through the control windings when the signal source is in the "off" condition. This signal source as in the first mentioned embodiment may be of the type of the magnetic control apparatus or copending apparatus Serial No. 625,953, filed December 3, 1956. The condenser in parallel with the rectifier and the inductance device 190 are used for impedance matching with the magnetic control device supplying the terminals 180, 181.

In operation, this embodiment of the static relay or static control device is identical with that of the first embodiment. The application of control current through the windings 123, 130, 153, 154, 170 and 171 with the application of an input signal to terminals 180, 181 provides energization and magnetization of the associated core structures of the saturable reactor and magnetic amplifier components. The normally open switching circuits formed by the power windings of the reactors 110 and 115 change the impedance from a high internal impedance to that of a low internal impedance producing a closed contact type operation. Similarly the normal by closed contacts are provided by the doubler type magnetic saturating magnetic amplifier units 135, 140 included in the switching circuits connected to the terminals 137, 138, 160 and 161 which will change from a condition of low internal impedance to a condition of high internal impedance with control energization. As in the before mentioned embodiment, the doubler magnetic amplifier circuits are so constructed that in the absence of energization of the control windings a maximum power output is obtained or a condition of low impedance is obtained from the amplifier. With the energization of the control windings, the internal impedance of the circuit is appreciably increased to provide an open circuit condition to the respective switching circuits associated therewith. The schematic relay circuits shown in FIGURE 3 which has been included herein merely to show application of the static relay or control device shown in the embodiments of FIGURES 1 and 2. This particular circuit forms no part of the subject invention and hence is shown in block form for simplicity. The circuit includes an energizing source indicated at 200 connected to a pair of conductors 201, 202 across which a plurality of devices are connected for energization purposes. The devices are generally shown in block form with blocks PS1 and PS2 indicated at 210, 212 respectively and are intended as schematic disclosures of the magnetic control apparatus shown in my copending application, Serial No. 625,953, filed December 3, 1956, now U.S. Patent 2,934,693 which will hereinafter be identified as proximity switches. These devices operate on the basis of an inductance bridge which senses the presence of a magnetic part in a predetermined relation therewith to produce a signal current output indicative of the presence of the magnetic or metallic part. The blocks indicated at SR1, SR2 and SR3 numbered 215, 216 and 217 respectively are magnetic controlled units or static relay units such as is shown in FIGURES 1 and 2 with associated contact circuits which will be more fully identified hereafter. Thus it will be seen in FIGURE 3 the conductors 201, 202 have connected across thereto the proximity switch PS1 identified by the number 210 which in turn is connected at its output section as indicated by conductors 220 to the input or control windings of a static relay SR1 indicated by the number 215. The static relay 215 has associated therewith a normally open contact switching circuit indicated by the contact arrangement at 234 and a normally closed contact arrangement or circuit indicated by the contact at 222. Similarly a proximity switch PS2 indicated by the number 212 has associated therewith through output terminals or connections 230 the static relay PS2 indicated by the number 216 which relay includes switching circuits of a normally closed type indicated by the contacts 233 and the switching circuit of the normally open type indicated by the contacts 221. The static relay 217 includes three switching circuits one of the normally open type indicated by the contact 235 which is connected in parallel with the contact 234 of static relay 215, a normally closed switching circuit indicated by the contact 240 which is connected to cross the conductors 201, 202 through an indicating lamp indicated at 245. A further normally open contact circuit for static relay 217 of the normally open type is shown at 250 which is connected to the conductor 201 and through a conductor 251 to an indicating lamp 252 which in turn is connected to conductor 202. A further circuit controlled by the contact circuit 250 includes a conductor 255, a full-wave rectifier 256 with a load coil 260 connected across the output thereof and with the other input terminal to the rectifier being connected to the conductor 202. As will be noted in the drawings, the normally closed contact 222 of the static relay 215 is connected across the conductor 201, 202 through a load device indicated at 265 to control the de-energization of the same. A similar load device is connected by the normally closed contact 233 of the static relay 216 across the conductors 201, 202. Thus it will be seen that the static relay 215 includes a normally open and a normally closed switching circuit similar to the type shown in FIGURE 1 but without a common lead connection between the normally open and normally closed circuits. The static relay 216 is of a similar construction to that of FIGURE 1, and the static relay 217 includes two normally open and one normally closed contact circuits. The circuitry of FIGURE 3 has been included as an example of the use of the static relays in place of conventional relays in switching circuitry. A typical application of the static relay control apparatus is in transfer apparatus along a manufacturing assembly line. The relay 215 will operate whenever the proximity switch 210 senses the presence of a magnetic part at a particular location where the proximity switch 210 is located on an assembly line. It will close contact 234 and if desired may be utilized to perform some further switching operation such as the operation of a load device 265 in a reverse manner at the same time. The proximity switch 212 positioned in a similar location at another point along a transfer line would sense a presence of a part and close its normally open contact 221 and open its normally closed contact 233 in the same manner to set up the circuit of the static relay 217 whose normally open contact 250 would close to energize a load coil through a full-wave rectifier 256 upon the satisfaction of two conditions, that is the operation of the relays 215 and 216. The holding circuit contact 235 permits continued energization of the relay contact 217 upon the de-energization of the static relay SR1 until the magnetic part had passed the position of proximity switch PS2. The normally closed contact 240 of the static relay 217 would be used to indicate the satisfaction of the two conditions of operation of the relays 215 and 216 to operate an indicating lamp 245 to an "off" position while the contact 250 could operate a second lamp 252 to an "on" condition for indication purposes.

It should be recognized that the disclosure in FIGURE 3 is merely a suggested utilization of static magnetic control devices or relays of the disclosure shown in FIGURES 1 and 2 and showing different contact configurations which may be incorporated therein. We have found that as many as eight independent or separate magnetic controllers may be incorporated in a single energization circuit giving the equivalent of eight relay contacts on a single controller.

The embodiment shown in FIGURE 4 is an improved arrangement for a double pole, double throw contact arrangement utilizing an A.C. type input. Normally open or saturable reactor type circuits are identified herein at 310 and 315 respectively, the reactor 310 including power windings 320, 321 mounted on a coil 322 and connected in series and in opposition to terminals 317, 316 respectively. The reactor 315 includes power windings 325, 326 mounted on a core 331 with the windings 325, 326 connected in opposition and to conductors to terminals 318, 319. In this embodiment, the reactors 310, 315 include a pair of control windings identified at 323, 372, 330 and 373 respectively. These control windings are mounted together with the power windings of the reactors on the cores 322, 331 for the reactors. The normally closed contact circuits herein are also of the doubler type and include in addition a feedback winding to differ from the embodiment of FIGURE 2. Thus the reactor identified at 335 includes a power winding 341, a control winding 353 and a feedback winding 374 with the reactor mounted on a core shown at 351. The other half of the reactor includes the core structure indicated at 352 which mounts the power winding 342, the control winding 354 and the feedback winding 375. In this arrangement, as in conventional self-saturating magnetic amplifiers, the power windings and the diodes 343 and 345 respectively are connected in series with the common connection between the rectifiers 348 connected through a conductor to the terminal 338 for the normally closed circuit. The opposite extremities of the power windings 341 and 342 respectively are connected to the feedback windings on the opposite reactor, that is the power winding 341 is connected to the feedback winding 375 on core 352 and from the winding 375 to the common connection 350 while the power winding 342 is connected to the feedback winding 374 on the core structure 351 and from the feedback winding to the common connection point 350 and terminal 331 to provide the parallel circuit for the doubler arrangement. The terminals 338 and 331 are adapted to be connected to remote circuit requiring the normally closed contact which is provided by this doubler arrangement. The second normally closed circuit is provided to the reactor or amplifier 340 which includes the core structure 368 upon which is mounted the power winding 363 connected to the rectifier 364 and the common point. The opposite core structure 367 includes the power winding 362 connected to the rectifier 365 to the common point and from the common point to the terminal 361. The cores 368 and 367 respectively have also mounted thereon control windings 371 and 370 and feedback windings 376, 377 respectively. The power winding 363 is connected to the feedback winding 377 of the core 367 and to the terminal 360 while the feedback winding 376 is connected to the power winding 362 on the core 367 with the opposite extremity of the feedback winding 376 being connected to a common point and to the terminal 360 to provide the parallel circuit for the power windings, feedback windings and rectifiers conventional with the doubler circuit.

The control windings for the reactors 310, 315 and amplifiers 335, 340 in this embodiment are normally energized from an alternating current source applied to the terminals 381, 380. Connected across the terminals is a first resistor element 390 and in series with the terminal 381 is a reactor 391 whose extremity is connected to an input terminal of a full wave rectifier 392 whose other input terminal is connected to a conductor leading to terminal 380. A second resistor element 395 is connected between the extremity of the reactor 391 common with the bridge type rectifier input or full wave rectifier 392 and the terminal 380 to provide a network for impedance matching purposes designed to match the input to the control windings with the remote A.C. source. The output terminals of the full wave rectifier indicated at 396, 397 are connected to the control windings, with a slight modification for the saturable reactor circuits. The terminal 396 is connected to a conductor 399 and the control winding 323 and 330 in series with resistor elements 400 and 401 respectively connected in parallel with the respective control windings. The windings 323 and 330 are also connected serially with the control windings 353, 354 of the amplifier 335 and control windings 371, 370 of the amplifier 340 to the output diagonal 397 of the bridge rectifier 392. In addition to the above, the control windings 372, 373 of the reactors 310, 315 are serially connected across the output diagonals 396, 397 of the rectifier with a condenser 405 and a resistor 406 in series therewith.

This embodiment operates in the same manner as the embodiment of FIGURE 2 in that the normally open contact circuits of the reactors 310 and 315 will operate to a closed position or that of low impedance as the input signal is applied to the terminals 380, 381 and the amplifiers 335, 340 will operate from a normally closed to a normally open condition or from a condition of low impedance to one of high impedance with the presence of the control signal in the respective control windings. The difference in this arrangement is that additional control windings 372, 373 of reactors 310, 315 are provided and connected in a parallel circuit with the remaining control winding to provide for a more positive control of the saturable reactors. The condenser 405 and resistor 406 provide the proper phasing for the control signal while the resistors 400, 401 in parallel with the windings 323, 330 are provided for impedance matching purposes.

In considering this invention it should be kept in mind that the present disclosure is intended to be illustrative only and that I wish to be limited only by the scope of my appended claims.

I claim:

1. A static control device comprising; a plurality of closed circuit magnetic core structures, a power winding on each of said core structures, a control winding on each of said core structures, at least two of said power windings having oppositely poled rectifiers connected in series therewith with said rectifiers and windings connected in a parallel relationship with one another to provide a first circuit adapted to be connected to an external load, other of said power windings being adapted to be connected directly to an external load to provide a second circuit, an additional circuit means connecting all of said control windings on said magnetic core structure in a series circuit, said first named circuits having a high impedance to current flow and said second named circuit having a low impedance to current flow with a flow of an input signal through said additional circuit to all of said control windings.

2. A static control device comprising, a plurality of closed circuit magnetic core structures, a power winding on each of said core structures, a control winding on each of said core structures, at least two of said power windings having oppositely poled rectifiers connected in series therewith with said rectifiers and windings connected in a parallel relationship with one another to provide a first circuit adapted to be connected to an external load, other of said power winding being adapted to be connected directly to an external load to provide a second circuit, an additional circuit means connecting all of said control windings on said magnetic core structure in a series circuit, said first named circuit having a high impedance to current flow, and said second named circuit having a low impedance to current flow with a flow of an input signal through said additional circuit to all of said control windings, said first and second named circuits having a common connection.

3. A static control device comprising, a plurality of closed circuit magnetic core structures, a plurality of power windings positioned on said magnetic core structures, some of said core structures having at least one power winding thereon, a plurality of control windings with a single control winding on each of said core structures, circuit means connecting at least two power windings on different core structures in series with oppositely poled rectifiers and with further connection means connecting the serial connected rectifiers and power windings in a parallel circuit to provide a first contact circuit adapted to be connected to and control the operation to a first remote circuit, additional circuit means connecting pairs of power windings on the same core structure in a serial type circuit to provide a second contact circuit adapted to be connected to control the energization of the second remote control circuit, and further circuit means connecting all of the control windings on said core structures in a series circuit into a common energizing signal source, said first and second contact circuits having different conditions of internal impedance with energization of said further circuit including said control windings to provide a normally closed and a normally open contact circuit respectively.

4. A static control device comprising, a plurality of closed circuit magnetic core structures, a power winding on each of said core structures, a control winding on each of said core structures, a pair of said core structures with at least two of said power windings having oppositely poled rectifiers connected in series therewith with said rectifiers and windings connected in parallel relationship with one another to provide a first circuit adapted to be connected to an external load, another pair of said core structures having at least one of said windings thereon being adapted to be connected directly to an external load circuit to provide a normally open type contact for each circuit, an additional circuit means connecting all of said control windings on said magnetic core structures in a series circuit, said first named circuits having a high impedance to current flow and said second named circuits having a low impedance to current flow with a flow of an input signal through said additional circuit to all of said control windings.

5. Electromagnetic switching apparatus comprising, a plurality of switching circuits each including one winding mounted on a magnetic circuit core structure, some of said switching circuits having a unidirectional current conducting device in series relationship to said winding therein, said switching circuits being adapted to vary from a condition of high internal impedance to low internal impedance to perform a switching type of operation with some of said circuits having a normally high internal impedance and others having a normally low internal impedance, control windings on each of said magnetic core structures of said plurality of circuits adapted to vary the magnetization of the said core structures to produce change in internal impedance of said switching circuits, and circuit means connecting all of said control windings in a series circuit to be energized from a remote signal source to perform a switching operation of said switching circuits.

6. Electromagnetic switching apparatus comprising, a plurality of electrically independent switching circuits each including one winding mounted on a continuous magnetic circuit core structure, some of said switching circuits having a unidirectional current conducting device in series relationship with said winding theren, said switching circuits being adapted to vary from a condition of high internal impedance to low internal impedance to perform a switching type of operation with some of said circuits having a normally high internal impedance and others having a normally low internal impedance, control windings on each of said magnetic core structures of said plurality of circuits adapted to vary the magnetization of the said core structures to produce change in internal impedance of said switching circuits, and circuit means connecting all of said control windings in a series circuit to be energized from a remote signal source to perform a switching operation of said switching circuits.

7. Electromagnetic switching apparatus comprising, a plurality of interconnected switching circuits each including one winding mounted on a continuous magnetic circuit core structure, some of said switching circuits having a unidirectional current conducting device in series relationship with said winding therein, said switching circuits being adapted to vary from a condition of high internal impedance to low internal impedance to perform a switching type of operation with some of said circuits having a normally high internal impedance and others having a normally low internal impedance, control windings on each of said magnetic core structures of said plurality of circuits adapted to vary the magnetization of the said core structures to produce change in internal impedance of said switching circuits, and circuit means connecting all of said control windings in a series circuit to be energized from a remote signal source to perform a switching operation of said switching circuits.

8. Electromagnetic switching apparatus comprising, a plurality of electrically independent switching circuits each including one winding mounted on a continuous magnetic circuit core structure, some of said switching circuits having a unidirectional current conducting device in series relationship with said winding therein, said switching circuits being adapted to vary from a condition of high internal impedance to low internal impedance to perform a switching type of operation with some of said circuits having a normally high internal impedance and others having a normally low internal impedance, control windings on each of said magnetic core structures of said plurality of circuits adapted to vary the magnetization of the said core structures to produce change in internal impedance of said switching circuits, and circuit means connecting all of said control windings in a circuit to be energized from a remote signal source to perform a switching operation of said switching circuits.

9. Electromagnetic switching apparatus comprising, a plurality of electrically independent switching circuits each including one winding mounted on a continuous magnetic circuit core structure, some of said switching circuits having a unidirectional current conducting device in series relationship with said winding therein, said switching circuits being adapted to vary from a condition of high internal impedance to low internal impedance to perform a switching type of operation with some of said circuits having a normally high internal impedance and others having a normally low internal impedance, control windings on each of said magnetic core structures of said plurality of circuits adapted to vary the magnetization of the said core structures to produce change in internal impedance of said switching circuits, circuit means connecting all of said control windings in a circuit to be energized from a remote signal source to perform a switching operation of said switching circuits, and rectifier means included in said last named circuit means to provide direct current type of energization to said control windings.

10. Electromagnetic switching apparatus comprising, a plurality of electrically independent switching circuits each including one winding mounted on a continuous magnetic circuit core structure, some of said switching circuits having a unidirectional current conducting device in series relationship with said winding therein, said switching circuits being adapted to vary from a condition of high internal impedance to low internal impedance to perform a switching type of operation with some of said circuits having a normally high internal impedance and others having a normally low internal impedance, control windings on each of said magnetic core structures of said plurality of circuits adapted to vary the magnetization of the said core structures to produce change in internal impedance of said switching circuits, circuit means connecting all of said control windings in a circuit to be energized from a remote signal source to perform a switching operation of said switching circuits, and impedance matching means included in said last named circuit.

11. Electromagnetic switching apparatus comprising, a plurality of switching circuits each including one winding mounted on a continuous magnetic circuit core structure, some of said switching circuits having a unidirectional current conducting device in series relationship with said winding therein, said switching circuits being adapted to vary from a condition of high internal impedance to low internal impedance to perform a switching type of operation with some of said circuits having a normally high internal impedance and others having a normal low internal impedance, control windings on each of said magnetic core structures of said plurality of circuits adapted to vary the magnetization of the said core structures to produce changes in internal impedance of said switching circuits, and circuit means connecting all of said control windings in circuit to be energized simultaneously from a remote signal source to perform a switching operation of said switching circuits.

12. An electromagnetic switching apparatus comprising, a plurality of independent switching circuits, some of said switching circuits including a saturable type reactor having a pair of windings mounted on a continuous circuit magnetic core structure and other of said circuits including a magnetic type amplifier of the doubler type having a pair of power windings with rectifiers in series therewith and with the power windings mounted respectively on a pair of continuous magnetic circuit core structures, said power windings and rectifiers of said other of said circuits being connected in parallel relation, said switching circuits being adapted to vary from a condition of high reflected impedance to a condition of low reflected impedance upon a change in magnetization of said core structures, said circuits including said saturable reactors having a normal high impedance and said magnetic amplifier circuits having a normal low impedance reflected to external load devices with which said switching circuits are adapted to be connected, control windings mounted on each of said magnetic core structures adapted to adjust the magnetization of the core structures and produce the change in the reflected impedance in said switching circuits, and circuits means connecting all of said control windings in a series relationship to be energized from a common source.

13. An electromagnetic switching apparatus comprising, a plurality of independent switching circuits, some of said switching circuits including a saturable type reactor having a pair of windings mounted on a continuous circuit magnetic core structure and other of said circuits including a magnetic type amplifier of the doubler type having a pair of power windings with rectifiers in series therewith and with the power windings mounted respectively on a pair of continuous magnetic circuit core structures, said power windings and rectifiers of said other of said circuits being connected in parallel relation, said switching circuits being adapted to vary from a condition of high reflected impedance to a condition of low reflected impedance upon a change in magnetization of said core structures, said circuits including said saturable reactors having a normal high impedance and said magnetic amplifier circuits having a normal low impedance reflected to external load devices with which said switching circuits are adapted to be connected, control windings mounted on each of said magnetic core structures adapted to adjust the magnetization of the core structures and produce the change in the reflected impedance in said switching circuits, and circuit means connecting all of said control windings to be energized from a common source.

14. An electromagnetic switching apparatus comprising, a plurality of interconnected switching circuits, some of said switching circuits including a saturable type reactor having a pair of windings mounted on a continuous circuit magnetic core structure and other of said circuits including a magnetic type amplifier of the doubler type having a pair of power windings with rectifiers in series therewith with the power windings mounted respectively on a pair of continuous magnetic circuit core structures, said power windings and rectifiers of said other of said circuits being connected in parallel relation, said switching circuits being adapted to vary from a condition of high reflected impedance to a condition of low reflected impedance upon a change in magnetization of said core structures, said circuits including said saturable reactors having a normal high impedance and said magnetic amplifiers circuits having a normal low impedance reflected to external load devices with which said switching circuits are adapted to be connected, control windings mounted on each of said magnetic core structures adapted to adjust the magnetization of the core structures and produce the change in the reflected impedance in said switching circuits, and circuit means connecting all of said control windings in a series relationship to be energized from a common source.

15. An electromagnetic switching apparatus comprising, a plurality of independent switching circuits, some of said switching circuits including a saturable type reactor having a pair of windings mounted on a continuous circuit magnetic core structure and other of said circuits including a magnetic type amplifier of the doubler type having a pair of power windings with rectifiers in series therewith with the power windings mounted respectively on a pair of continuous magnetic circuit core structures and with the power windings and rectifiers connected in parallel relation, said switching circuits being adapted to vary from a condition of high reflected impedance to a condition of low reflected impedance upon a change in magnetization of said core structures, said circuits including said saturable reactors having a normal high impedance and said magnetic amplifier circuits having a normal low impedance reflected to external load devices with which said switching circuits are adapted to be connected, control windings mounted on each of said magnetic core structures adapted to adjust the magnetization of the core structures and produce the change in the reflected impedance in said switching circuits, and means including rectifier means connecting all of said control windings to be energized from a common source.

16. An electromagnetic switching apparatus comprising, a plurality of independent switching circuits, some of said switching circuits including a saturable type reactor having a pair of windings mounted on a continuous circuit magnetic core structure and other of said circuits including a magnetic type amplifier of the doubler type having a pair of power windings and feedback windings with rectifiers in series therewith mounted on a pair of continuous magnetic circuit core structures and with the power windings and feedback windings and rectifiers connected in parallel relation, said switching circuits being adapted to vary from a condition of high reflected impedance to a condition of low reflected impedance upon a change in magnetization of said core structures, said circuits including said saturable reactors having a normal high impedance and said magnetic amplifier circuits having a normal low impedance reflected to external load devices with which said switching circuits are adapted to be connected, control windings mounted on each of said magnetic core structures adapted to adjust the magnetization of the core structures and produce the change in the reflected impedance in said switching circuits, and circuit means connecting all of said control windings to be energized from a common source.

References Cited in the file of this patent

UNITED STATES PATENTS

| | | |
|---|---|---|
| 2,464,639 | Fitzgerald | Mar. 15, 1949 |
| 2,509,864 | Hedstrom | May 30, 1950 |
| 2,591,406 | Carter | Apr. 1, 1952 |